United States Patent Office 3,143,575
Patented Aug. 4, 1964

3,143,575
CHLORINATION OF BISPHENOLS
Fred Bryner and Andrew J. Dietzler, Midland, Mich., assignors to The Dow Chemical Company, Midland, Mich., a corporation of Delaware
No Drawing. Filed Apr. 20, 1961, Ser. No. 104,208
6 Claims. (Cl. 260—619)

The present invention relates to a novel method for preparing halogenated bisphenols. More particularly the present invention concerns a process wherein a purer, less colored product is obtained in a more expeditious manner than heretofore thought possible.

Bisphenols have been chlorinated and brominated for some time with fairly good results. However, as greater purity and less color is required by resin manufacturers the prior art methods are fast becoming too expensive due to the clean up required to meet specifications. Therefore it would be advantageous to provide a process which produces clear, clean halogenated bisphenols in good yields in a single reaction with only a washing of the crystals after reaction to obtain a salable product.

It has now been found that in the solvent-chlorination of bisphenols the addition of from about 0.1 to about 5 percent by weight of water based on the solvent produces a product of reaction which is of higher purity and lower color than the product would have were it produced in conventional manner. It has also been found that the employment of a solvent in the chlorine stream prevents the build-up of color in the chlorine feed inlet and prevents plugging of the chlorine feed inlet during formation of the tetrachlorinated bisphenols.

The chlorinated hydrocarbon solvents which can be employed in accordance with the present invention are the mono- and polychlorinated aliphatic compounds having from 1 to 5 or more carbon atoms. More particularly the class of compounds suitable for use as either or both the reaction solvent and/or the chlorine gas diluent include the chlorinated hydrocarbon solvents having from 1 to 3 carbon atoms and 2 to 4 chlorine atoms such as methylene chloride, chloroform, carbon tetrachloride, ethylene chloride, methylchloroform (1,1,1-trichloroethane), tetrachloroethane, trichloroethylene, tetrachloroethylene (perchloroethylene), propylene chloride, and the like. The commercially advantageous solvents are carbon tetrachloride, methyl chloroform and perchloroethylene. It is to be understood that when the unsaturated (olefinic) solvents are employed it is desirable to employ a stabilizer in the gas-stream diluent solvent. We have found the most advantageous stabilizers to be chlorinated bisphenol and the bisphenol which is being chlorinated in accordance with this invention. Thus, when chlorinating 4,4'-isopropylidene bisphenol it is advantageous to employ the di- or tetrachloroisopropylidene bisphenol as the chlorine gas diluent stabilizer. The stabilizer is suitably employed in amounts from about 0.05 to about 1.0 percent by weight of the diluent (solvent) and preferably from about 0.1 to 0.5 percent.

The mole ratio of reactants can be in the range of from 4 to 4.6 moles of halogen per 1 mole of bisphenol when tetrahalogenating and from 2 to 2.3 moles of halogen per 1 mole of bisphenol when dihalogenating.

The solvent is employed in an amount sufficient to maintain the reactant bisphenol as a slurry. The amount of solvent is generally such as to provide a concentration of bisphenol in solvent of from about 1 to about 35 percent by weight, based on the solvent and preferably about 10 to 25 percent.

The diluent is suitably employed in the chlorine stream in from about 10 to 50 weight percent.

The reaction proceeds readily at temperatures of from about 30° to 80° C. and preferably from about 40° to 70° C.

Substantially any bisphenol which can be chlorinated by present methods can be chlorinated in accordance with the present invention with improved yield and color. 4,4'-isopropylidene bisphenol (bisphenol A), 4,4'-methylene bisphenol, 4,4'-ethylidene bisphenol, 4,4'-propylidene bisphenol, 4,4'-butylidene bisphenol, 4,4'-sec. butylidene bisphenol, 4,4'-cyclohexylidene bisphenol, 4,4'-isopropylidene bis(2-methylphenol), 4,4'-isopropylidene bisphenylphenol, 4,4'-(4-methylpentylidene) bisphenol, 4,4'-isopropylidene bis(2-ispropyl phenol), 4,4'-isopropylidene bis(2-t.-butyl phenol), and 4,4'-sulfonyl bisphenol, as well as their mono and polynuclearly chlorinated derivates so long as at least one carbon atom ortho to the phenolic hydroxyl group is unsubstituted. 4,4'-isopropylidene bis(2-chlorophenol) can be employed as a starting reactant for chlorination in accordance with the present invention to the tetrachloro derivative. Thus, it is apparent that any bisphenol having at least one position ortho to the hydroxyl group free of substitution can be chlorinated in the manner of the present invention. Generically any alkylidene bisphenol having the formula

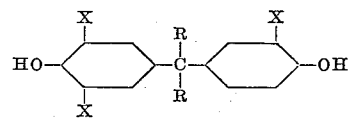

wherein each R represents hydrogen, lower alkyl, or both together with the carbon atom of attachment form a cycloaliphatic ring having 5 to 6 carbon atoms, and each X represents independently hydrogen, chlorine or lower alkyl having from 1 to 4 carbon atoms can be used.

The following examples illustrate the present invention but are not to be construed as limiting.

GENERAL PROCEDURE

A bisphenol is slurried with a liquid chlorinated hydrocarbon and warmed to reaction temperature. The reaction mixture is agitated and chlorine gas introduced below the suface of the slurry as rapidly as it is absorbed in the reaction mixture. Since the reaction is somewhat exothermic external cooling is employed where necessary to maintain the desired reaction temperature. Upon completion of the addition of chlorine the reaction mixture, a slurry is maintained at the reaction temperature for a short period of time, then blown with nitrogen to sweep out any unreacted chlorine and any dissolved HCl of reaction. During this entire period the reaction mixture is subjected to agitation. Thereafter the reaction mixture is cooled to about 25° C. whereupon crystallization is completed and the crystals recovered on a Büchner funnel. The crystals are washed twice with 50 ml. portions of the chlorinated hydrocarbon solvent, then four times with 100 ml. portions of water, then dried. The color of the product is determined by comparing a solution of 10 grams of the product in 50 ml. of methanol with an APHA color standard.

Alternative and additional steps include the addition of water to the reaction solvent, and addition of a diluent to the chlorine gas stream. The latter is accomplished by bubbling the chlorine gas through the diluent or spraying the diluent into the chlorine feed inlet.

In a series of experiments run by the above procedure, 1 g. mole of 4,4'-isopropylidene bisphenol was treated with 4.12 moles of chlorine at a temperature of about 60° C., the bisphenol being slurried in 580–600 ml. of perchloroethylene solvent. Results of these experiments are shown in Table I.

*Table I.—Chlorination of 4,4'-Isopropylidene Bisphenol*

| Example No. | Reaction Condition Time, Hours | Percent by Weight H₂O in Reaction Solvent | Chlorine Diluent | APHA Color of Product | Remarks |
|---|---|---|---|---|---|
| 1 | 4.5 | ¹ 0 | 0 | 85 | Chlorine feed inlet plugged |
| 2 | 4.9 | 0 | 0 | 70 | Do. |
| 3 | 5.5 | 1 | 0 | 35 | Do. |
| 4 | 4.6 | 1 | CCl₄ | 20 | |
| 5 | 5.5 | 0.1 | 0 | 55 | Do. |
| 6 | 4.0 | 5 | 0 | 45 | Do. |
| 7 | 3.1 | 1 | CH₃CCl₃ | 20 | |
| 8 | 3.6 | 1 | CHCl₃ | 30 | |
| 9 | 3.5 | 1 | C₂Cl₄ ² | 25 | |
| 10 | 3.4 | 1 | CH₂Cl₂ | 30 | |

¹ Reactants dried before use, reactor dried and CaCl₂ tube in HCl vent line.
² Inhibited with 0.5% bisphenol A.

EXAMPLE 11

The following runs illustrate semi-continuous operation wherein the mother liquor from a previous cycle was recycled as the solvent for the subsequent run. In each case the mother liquor was brought to the original solvent weight by addition of fresh solvent.

In the first run, 122 lbs. (0.535 mole) of p,p'-isoproylidenediphenol was chlorinated in 698 lbs. of perchloroethylene containing 5.2 lbs. of water over a 3.8 hour period at 55–60° C. Perchloroethylene containing 0.1% of 4,4'-isopropylidenebis(2-chlorophenol) was pumped as a spray into the top of the chlorine dip-pipe at the rate of 7.5 lbs./hr. Chlorine, 156 lbs. (2.2 moles), was added through the dip-pipe below the surface of the liquid in the reactor.

When all the chlorine was added the reaction mixture was blown with nitrogen to remove any residual HCl of reaction. The batch was cooled to 25° C., filtered, and the filter cake washed with perchloroethylene and finally with water. After drying there was obtained 146 lbs. of 4,4'-isopropylidenebis(2,6-dichlorophenol) representing a yield of 75%. The product had a melting point of 133–134° C. and an APHA color of 25. From this run was obtained 673 lbs. of mother liquor.

In a second run 122 lbs. of 4,4'-isopropylidenediphenol was taken up in 645 lbs. of mother liquor from Run No. 1 plus 53 lbs. of fresh perchloroethylene. Water, 5.2 lbs., was added and the mixture chlorinated as before using 156 lbs. of chlorine at 50–55° C. In this run 37 lbs. of a mixture consisting of 50% mother liquor from Run No. 1 and 50% fresh perchloroethylene was pumped into the top of the chlorine feed-pipe. As a result of these operations there was obtained 169 lbs. of product having a melting point of 133.5–134.5° C. and an APHA color of 35. In the table below there is shown the results of a series of 12 consecutive runs using the mother liquor from the preceding run as reaction solvent as described above.

| Recycle No. | Percent Yield | Melting Point (° C.) | APHA Color |
|---|---|---|---|
| 0 | 75 | 133–134 | 25 |
| 1 | 86 | 133.5–134.5 | 35 |
| 2 | 94 | 134–135 | 40 |
| 3 | 95.9 | 133.5–134.5 | 50 |
| 4 | 93.5 | 134–135 | 60 |
| 5 | 86.8 | 134–135 | |
| 6 | 97.4 | 133.5–134.5 | 50 |
| 7 | 84.2 | 133–134 | 60 |
| 8 | 87.8 | 133–134 | 60 |
| 9 | 98.5 | 133–134 | 60 |
| 10 | 92.3 | 133–134 | 65 |
| 11 | 96.3 | 133–134 | 60 |

When a series of recycle runs were made as above, but without added water in the solvent, and without dilution of the chlorine stream with solvent, the results as shown below were obtained.

| Recycle No. | Percent Yield | Melting Point (° C.) | APHA Color |
|---|---|---|---|
| 1 | 80.2 | 131–133 | 60 |
| 7 | 90.0 | 131–133 | 125 |

EXAMPLE 12

4,4'-sec-butylidenebis(2,6-dichlorophenol) was made by chlorinating p,p'-sec-butylidenediphenol employing the procedure of Example 5. p,p'-Sec-butylidenediphenol, 181.7 g. (0.75 mole) was mixed with 413 ml. of perchloroethylene and 6.7 ml. of water and warmed under agitation to 59° C. Chlorine, 219 g. (3.084 moles) was bubbled through 65 ml. of CCl₄ and the gaseous mixture added below the surface of the batch. The reaction was continuously stirred and maintained at 55–60° C. The addition of the chlorine took 3.43 hours. Carbon tetrachloride (34 ml.) was carried into the batch by the chlorine. After all the chlorine had been added the batch was maintained at reaction temperature with stirring for 15 minutes, then blown with nitrogen for 45 minutes. The resulting slurry upon cooling to 25° C. was filtered on a Büchner funnel and the crystals washed twice using 50 ml. portions of perchloroethylene followed by three washes with 200 ml. portions of water. After drying the 4,4'-sec-butylidene(2,6-dichlorophenol) there was obtained a product having a melting point of 141–142.5° C. representing an 83.5% yield.

The following examples illustrate dichlorination of bisphenols in the manner of the present invention.

EXAMPLE 13

Perchloroethylene, 632 lbs., 6.3 lbs. of water, and 162.5 lbs. (0.712 mole) of 4,4'-isopropylidenediphenol were loaded into a glass-lined kettle. The resulting slurry was warmed to 50° C., and 104 lbs. (1.466 lb. moles) of chlorine was added over a 5 hours period with stirring while maintaining the temperature at 50°–60° C. Nitrogen was then blown through the reaction mixture for 2 hours while maintaining the temperature at 50–60° C.

The reaction mixture was then distilled at 50–60° C. and at a pressure of 50–100 mm. of Hg pressure absolute until 505 lbs. of solvent was removed. The residue was then cooled with stirring to 25° C. to complete crystallization and filtered. The crystals were washed in a portionwise manner with a total of 60 lbs. of perchloroethylene and then dried at 60–65° C. for 9 hours in a forced air oven.

There was obtained 177 lbs., representing an 83.7% yield, of 4,4'-isopropylidenebis(2-chlorophenol) product of melting point 89.6–90.6° C. This material by infrared analysis was of 98% purity and had a color of about 25 APHA units. This material did not discolor on standing for 11 months.

We claim:
1. In a process for chlorinating a diphenol having the general formula

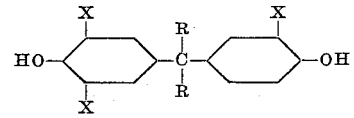

wherein each R represents a member selected from the group consisting of hydrogen, lower alkyl, and when joined together a cycloaliphatic ring having 5 to 6 carbon atoms, and each X represents a member selected from the group consisting of hydrogen, chlorine and lower alkyl radicals having from 1 to 4 carbon atoms wherein the diphenol is reacted with chlorine in the presence of a chlorinated aliphatic hydrocarbon solvent, the improvement of carrying out the reaction in the presence of about 0.5 to 5%, by weight, of water, based on the solvent.

2. The process of claim 1 wherein a chlorinated aliphatic hydrocarbon solvent is introduced as a diluent in the chlorine gas.

3. The process of claim 2 wherein said diluent is employed in from 10 to 50 weight percent based on the chlorine gas.

4. The process of claim 2 wherein said chlorine gas diluent and said chlorinated hydrocarbon solvent are perchloroethylene inhibited with from 0.05 to about 1.0 percent by weight of a member selected from the group consisting of 4,4'-isopropylidenebisphenol and its chlorinated derivatives.

5. The process of claim 1 wherein chlorine is employed in an amount of from about 2 to 2.3 moles per mole of diphenol.

6. The process of claim 1 wherein chlorine is employed in an amount of from about 4 to 4.6 moles per mole of diphenol.

References Cited in the file of this patent
UNITED STATES PATENTS
2,542,972    Thompson _____ Feb. 27, 1951